United States Patent
Xu et al.

(10) Patent No.: US 11,853,820 B2
(45) Date of Patent: Dec. 26, 2023

(54) CROSS-PROCESS COMMUNICATION METHOD, APPARATUS, AND DEVICE

(71) Applicant: Huawei Technologies Co., Ltd., Shenzhen (CN)

(72) Inventors: Ji Xu, Shanghai (CN); Tianyang Mao, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 41 days.

(21) Appl. No.: 17/649,280

(22) Filed: Jan. 28, 2022

(65) Prior Publication Data

US 2022/0156133 A1 May 19, 2022

Related U.S. Application Data

(63) Continuation of application No. PCT/CN2020/103876, filed on Jul. 23, 2020.

(30) Foreign Application Priority Data

Jul. 29, 2019 (CN) .......................... 201910691548.8

(51) Int. Cl.
*G06F 9/54* (2006.01)
*H04W 48/08* (2009.01)

(52) U.S. Cl.
CPC .............. *G06F 9/547* (2013.01); *G06F 9/546* (2013.01); *H04W 48/08* (2013.01)

(58) Field of Classification Search
None
See application file for complete search history.

(56) References Cited

U.S. PATENT DOCUMENTS

| | | | |
|---|---|---|---|
| 5,815,709 A * | 9/1998 | Waldo ................... | G06F 9/4488 707/E17.036 |
| 2014/0082117 A1 | 3/2014 | Unhale et al. | |
| 2014/0215078 A1* | 7/2014 | Seth ................... | H04L 67/1078 709/226 |
| 2016/0373881 A1* | 12/2016 | Li ........................... | H04L 67/53 |

FOREIGN PATENT DOCUMENTS

| | | | | |
|---|---|---|---|---|
| CN | 104184618 A | | 12/2014 | |
| CN | 105204951 A | * | 12/2015 | ............... G06F 9/54 |
| CN | 106547567 A | | 3/2017 | |
| CN | 106547634 A | | 3/2017 | |
| CN | 108182121 A | | 6/2018 | |
| CN | 108804236 A | | 11/2018 | |
| CN | 109766276 A | | 5/2019 | |
| CN | 110569130 A | | 12/2019 | |
| WO | 2016030747 A1 | | 3/2016 | |
| WO | WO 2016118145 A1 | * | 7/2016 | ............. G06F 21/54 |

* cited by examiner

*Primary Examiner* — Charles E Anya
(74) *Attorney, Agent, or Firm* — SLATER MATSIL, LLP

(57) ABSTRACT

A terminal device includes a first application and at least one second application. The at least one second application accesses a service in the first application. The at least one second application sends an access request to the first application through cross-process communication. Because the access request includes an identifier uniquely corresponding to a target service interface of the service, the first application determines the target service interface based on the identifier, and executes a method object corresponding to the target service interface to generate an execution result.

16 Claims, 9 Drawing Sheets

---

401

A second application sends an access request to a first application through cross-process communication, where the access request is used to request to access a service in the first application, and the access request includes an identifier uniquely corresponding to a target service interface of the service

402

The first application determines the target service interface based on the identifier, and executes a method object corresponding to the target service interface to generate an execution result

CROSS-PROCESS COMMUNICATION METHOD, APPARATUS, AND DEVICE

CROSS-REFERENCE TO RELATED APPLICATIONS

This application is a continuation of International Application No. PCT/CN2020/103876, filed on Jul. 23, 2020, which claims priority to Chinese Patent Application No. 201910691548.8, filed on Jul. 29, 2019. The disclosures of the aforementioned applications are hereby incorporated by reference in their entireties.

TECHNICAL FIELD

This application relates to the field of terminal technologies, and in particular, to a cross-process communication method, an apparatus, and a device.

BACKGROUND

Processes in an Android system cannot share memories. Therefore, some mechanisms need to be provided for data communication between different processes. To enable another application to access a service provided by a current application, the Android system uses an Android interface definition language (AIDL) to open an interface of the service provided by the current application and provide an AIDL tool for automatically converting, into an intermediate file (usually a .java file), an AIDL file (usually an .AIDL file) written by a developer by using the AIDL. The AIDL tool is integrated into an Android studio (Android development platform) tool chain, and is automatically triggered and executed during compilation. The AIDL tool provides the intermediate file to the another application and the current application. The another application and the current application integrate the Java file into respective projects to implement cross-process service calling.

Currently, if versions of AIDL files used by the another application and the current application are different, the following problem is likely to occur: An error is reported and a function is unavailable in a cross-process service calling process.

SUMMARY

Embodiments of this application provide a cross-process communication method, an apparatus, and a device, to improve compatibility of AIDL files of different versions and improve reliability of cross-process service calling.

According to a first aspect, an embodiment of this application provides a cross-process communication method. The method is applicable to a terminal device, and the method includes: At least one second application sends an access request to a first application through cross-process communication. The access request is used to request to access a service in the first application, and the access request includes an identifier uniquely corresponding to a target service interface of the service. Then the first application determines the target service interface based on the identifier, and executes a method object corresponding to the target service interface to generate an execution result.

In this embodiment of this application, in the method, cross-process communication is implemented based on a new AIDL file conversion method, so that reliability of cross-process service calling can be improved to some extent.

In a possible design, before the at least one second application sends the access request to the first application through cross-process communication, the method further includes:

The at least one second application determines, by using a first Java file, an identifier uniquely corresponding to attribute information of the target service interface. The attribute information includes at least one of an interface name and an interface parameter type of the target service interface, and the first Java file corresponds to a first-version Android interface definition language AIDL file of the first application. Then the first application determines the target service interface based on the identifier in the following specific manner: The first application determines, by using a second Java file, the target service interface corresponding to the identifier. The second Java file corresponds to a second-version AIDL file of the first application.

In this embodiment of this application, different service interfaces correspond to different identifiers, and a same service interface corresponds to a same identifier. Therefore, the second application can access a service in the first application based on an identifier uniquely corresponding to a service interface.

In a possible design, the identifier uniquely corresponding to the attribute information of the target service interface is a hash value obtained by performing a hash operation on at least one of the interface name and the interface parameter type of the target service interface. The first Java file is obtained by converting the first-version AIDL file according to a specified rule, the second Java file is obtained by converting the second-version AIDL file according to the specified rule, and the specified rule includes: obtaining attribute information of each service interface from the first-version AIDL file of the first application, and determining, based on the attribute information of each service interface, an identifier uniquely corresponding to each service interface; and converting the AIDL file into a Java file based on the identifier uniquely corresponding to each service interface.

According to a second aspect, an embodiment of this application provides an AIDL file conversion method. The method is applied to a device with a development function, and the method includes: The device obtains attribute information of a service interface from an AIDL file of a first application, and the device determines, based on the attribute information of the service interface, an identifier uniquely corresponding to the service interface, and then converts the AIDL file into a Java file based on the identifier uniquely corresponding to the service interface.

In this embodiment of this application, the method can improve compatibility of AIDL files of different versions and improve reliability of cross-process service calling to some extent.

In a possible design, the attribute information includes at least one of an interface name and an interface parameter type. The device determines, based on the attribute information of the service interface in the following specific manner, the identifier uniquely corresponding to the service interface: The device performs a hash operation on at least one of the interface name and the interface parameter type of the service interface to generate a hash value corresponding to the service interface. Different service interfaces have different hash values, and a same service interface has a same hash value.

The device converts, in the following specific manner, the AIDL file into the Java file based on the identifier uniquely corresponding to the service interface: The device converts the AIDL file into the Java file based on the hash value corresponding to the service interface.

In this embodiment of this application, the device may determine, by using the foregoing method, the hash value uniquely corresponding to the interface, to ensure that a service in the first application can be normally accessed.

In a possible design, the device further sends the Java file to a server corresponding to at least one second application. The at least one application is an application accessing a service in the first application.

In this embodiment of this application, the device sends the Java file to the second application, so that the second application accesses the service in the first application.

According to a third aspect, an embodiment of this application provides a terminal device, including a processor and a memory. The memory is configured to store one or more computer programs. When the one or more computer programs stored in the memory are executed by the processor, the terminal device is enabled to implement the method according to any one of possible designs of the first aspect.

According to a fourth aspect, an embodiment of this application further provides an apparatus. The apparatus includes modules/units for performing the method according to any one of possible designs of the first aspect. These modules/units may be implemented by hardware, or may be implemented by hardware by executing corresponding software.

According to a fifth aspect, an embodiment of this application provides a device, including a processor and a memory. The memory is configured to store one or more computer programs. When the one or more computer programs stored in the memory are executed by the processor, the electronic device is enabled to implement the method according to any one of possible designs of the second aspect.

According to a sixth aspect, an embodiment of this application further provides an apparatus. The apparatus includes modules/units that perform the method according to any one of possible designs of the second aspect. These modules/units may be implemented by hardware, or may be implemented by hardware by executing corresponding software.

According to a seventh aspect, an embodiment of this application further provides a computer-readable storage medium. The computer-readable storage medium includes a computer program. When the computer program is run on an electronic device, the electronic device is enabled to perform the method according to any one of possible designs of the first aspect.

According to an eighth aspect, an embodiment of this application further provides a computer program product. When the computer program product is run on a terminal, the electronic device is enabled to perform the method according to any one of possible designs of the first aspect.

These aspects or other aspects in this application are clearer and more comprehensible in descriptions of the following embodiments.

DETAILED DESCRIPTION OF ILLUSTRATIVE EMBODIMENTS

Figure 1:
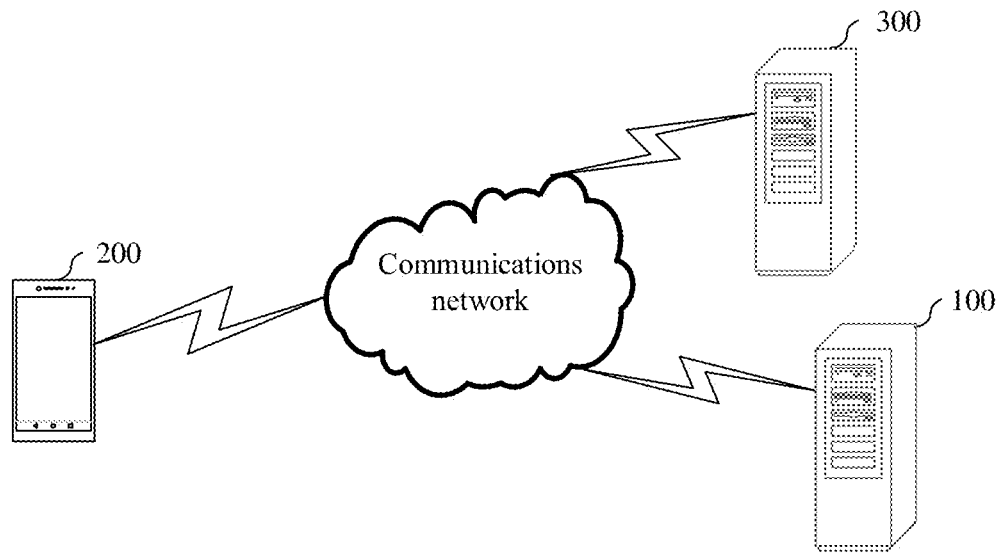
FIG. 1 is a schematic diagram of a communications system according to an embodiment of this application.

For ease of understanding, some concepts related to the embodiments of this application are provided as examples for reference.

Cross-process communication is communication between a plurality of applications installed on a same terminal device. In other words, one or more applications installed on the terminal device access another application installed on the terminal device. In the following descriptions, an accessed first application is also expressed as a local application or a service process, and a second application accessing the first application is expressed as a third-party application or a client.

An AIDL file is manually written by a developer. An operating system may convert the AIDL file into a Java file by using an AIDL conversion tool.

A system software package is an installation package of system software. The system software is an interface for interaction between computer hardware and a user. The most representative system software is an operating system. For example, Windows 7 and Android 6.0 are operating systems.

An application software package is an installation package of an application running on an operating system. The application installation package is related to a specific application, and is customized and developed by a developer based on a specific requirement of a user, for example, Meitu Xiu Xiu or BeautyCam.

An IDE is an application used in a program development environment, and usually includes a code editor, a compiler, a regulator, and a graphics tool. For example, Xcode programming software on an iOS system and Eclipse programming software on an Android system are typical IDEs.

When converting an AIDL file into a Java file, an existing AIDL conversion tool allocates consecutively incrementing sequence numbers starting from 1 to all interfaces in the AIDL file. The sequence numbers are defined in a constant of the Java file. For example, three service interfaces provided by a camera application to the outside are defined in a first-version AIDL file, and are an aperture service interface (void Aperture), a portrait service interface (void Portrait), and a nightscape service interface (void Nightscape). When converting the first-version AIDL file, the existing AIDL conversion tool sequentially allocates sequence numbers 1, 2, and 3 to the aperture service interface, the portrait service interface, and the nightscape service interface, and converts the first-version AIDL file to generate a first-version Java file. In this case, a correspondence between the service interfaces and the sequence numbers in the first-version Java file is shown in Table 1.

TABLE 1

| Service interface | Sequence number |
| --- | --- |
| Aperture service interface (void Aperture) | 1 |
| Portrait service interface (void Portrait) | 2 |
| Nightscape service interface (void Nightscape) | 3 |

It is assumed that a developer performs encapsulation to generate a second-version AIDL file after deleting a function of the camera application, and two service interfaces provided by the camera application to the outside are defined in the second-version AIDL file, and are the portrait service interface (void Portrait) and the nightscape service interface (void Nightscape). In other words, the developer deletes the aperture service interface (void Aperture) when writing the second-version AIDL file. In this case, when converting the second-version AIDL file, the existing AIDL conversion tool sequentially allocates sequence numbers 1 and 2 to the portrait service interface and the nightscape service interface, and converts the second-version AIDL file to generate a second-version Java file. In this case, a correspondence between the service interfaces and the sequence numbers in the second-version Java file is shown in Table 2.

TABLE 2

| Service interface | Sequence number |
| --- | --- |
| Portrait service interface (void Portrait) | 1 |
| Nightscape service interface (void Nightscape) | 2 |

It is assumed that a first Java file (the first Java file is obtained by converting the first-version AIDL file) is integrated into an application software package obtained by a mobile phone from a third-party application server (for example, a BeautyCam application server), and after a software system of the mobile phone is updated, a second Java file (the second Java file is obtained by converting the second-version AIDL file) is integrated into a system software package. The mobile phone installs the application software package and runs a third-party application. When the third-party application calls the nightscape service interface (void Nightscape) of the camera application, the third-party application determines, by using the first Java file, that a sequence number corresponding to an interface name of the nightscape service interface (void Nightscape) is 3, and then the third-party application sends a call request including the sequence number to the camera application. After receiving the call request, the camera application determines, by searching the second Java file, that a service interface corresponding to the sequence number 3 does not exist. Therefore, the camera application feeds back, to the third-party application, a call result that the function is unavailable. Consequently, in a hardware environment in which the nightscape function of the mobile phone is actually available, the nightscape function cannot be normally used because of a service interface interconnection failure, and the third-party application can present only relatively poor photographing quality to a user, seriously affecting user experience.

For the foregoing reasons, an embodiment of this application provides an AIDL file conversion method. The method may be applied to a side of a device with a compilation function. The method includes: The device obtains attribute information of a service interface from an AIDL file of a first application. The service interface is one or more service interfaces provided by the first application. The device determines, based on the attribute information of the service interface, an identifier uniquely corresponding to the service interface, and then the device converts the AIDL file into a Java file based on the identifier uniquely corresponding to the service interface. It can be learned that because a service interface in a Java file has a uniquely corresponding identifier, when the Java file is integrated into an application software package of a third-party application, the third-party application may determine, by using the Java file, an identifier uniquely corresponding to attribute information of a called service interface, and then the third-party application sends a call request including the uniquely corresponding identifier to a local application. Assuming that a version number of a Java file integrated into the local application is higher than a version number of the Java file integrated into the third-party application, the local application may determine, by using the Java file integrated into the local application, a service interface corresponding to the identifier, then execute a method object corresponding to the service interface, and feed back an execution result to the third-party application.

In other words, in this embodiment of this application, an AIDL tool included in Android is improved. The improved AIDL tool can execute a software program corresponding to the foregoing AIDL file conversion method, and convert an AIDL file into a Java file. The Java file is integrated into a system software package of the local application and the application software package of the third-party application. Generally, the local application is an application included in the system; and the third-party application is an application newly created by a developer, and an owner of the application is not a system manufacturer or a device manufacturer running the application. In this embodiment of this application, even if a version of Java in the application software package of the third-party application is earlier than a version of a Java file in the system software package of the local application, in other words, a version of an AIDL file used by the third-party application is earlier than a version of an AIDL file of the local application, the local application can still determine a corresponding service interface based on a correspondence between a service interface and an identifier in the Java file by using an identifier in a call request sent by the third-party application. Therefore, the method can improve compatibility of AIDL files of different versions and improve reliability of cross-process service calling to some extent.

As shown in FIG. 1, an embodiment of this application provides a communications system. The communications system includes a device 100, a terminal device 200, and a server 300. The terminal device 200 and the device 100 may be directly connected by using a data cable, or may communicate with each other by using a communications network, and the device 100 and the server 300 communicate with each other by using the network. An integrated development environment (IDE) is installed on the device 100, and is configured to generate a system software package of the terminal device 200 through compilation. The server 300 is a third-party application server, and is configured to generate an application software package of a third-party application through compilation.

The communications network may be a local area network, or may be a wide area network transited by using a relay device. When the communications network is the local area network, for example, the communications network may be a short-distance communications network such as a Wi-Fi hotspot network, a Wi-Fi direct network, a Bluetooth network, a ZigBee network, or a near field communication (NFC) network. When the communications network is the wide area network, for example, the communications network may be a 3rd generation mobile communication technology (3G) network, a 4th generation mobile communication technology (4G) network, a 5th generation mobile communication technology (5G) network, a future evolved public land mobile network (PLMN), or an internet.

Specifically, after a developer writes an AIDL file of a local application on the device 100, the device 100 obtains attribute information of a service interface from the AIDL file of the local application by using the foregoing integrated improved AIDL conversion tool, determines, based on the attribute information of the service interface, an identifier uniquely corresponding to the service interface, and then converts the AIDL file into a Java file based on the identifier uniquely corresponding to the service interface. The Java file is integrated into a system software package of the device 100. In addition, the device 100 further provides the Java file to the server 300, and the server 300 integrates the Java file into the application software package of the third-party application.

The terminal device 200 downloads an updated system software package from the device 100, locally saves the updated system software package, and updates the installed local application on the terminal device 200. The terminal device 200 downloads an updated application software package from the server 300, locally saves the updated application software package, and updates the installed third-party application on the terminal device 200. When version updates of the local application and the third-party application may be different, an AIDL file version update of the third-party application lags behind that of the local application.

Figure 2:
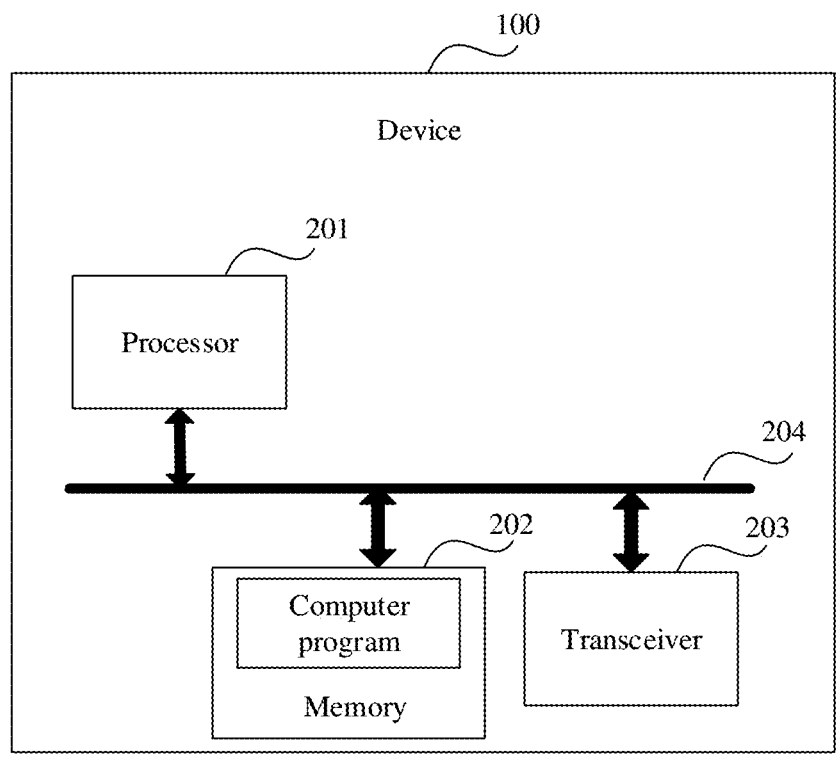
FIG. 2 is a schematic diagram of a structure of a device with a development function according to an embodiment of this application.

In some embodiments of this application, the device 100 may be a server or a cloud server with a compilation function. FIG. 2 is a block diagram of a partial structure of the device 100 related to the embodiments of this application.

As shown in FIG. 2, the device wo may include a processor 201, a memory 202, and a transceiver 203. One or more computer programs are stored in the memory 202 and configured to be executed by the one or more processors 201.

The processor 201 may be a central processing unit (CPU), a digital processing unit, or the like. As a control center of the device 100, the processor 201 is connected to all parts of the entire device 100 by using various interfaces and lines, and performs various functions and data processing of the device 100 by running or executing the computer programs stored in the memory 202 and calling data stored in the memory 202.

The memory 202 is configured to store a to-be-run computer program. If the device 100 is a cloud server, the memory 202 further stores a compilation result that is obtained from a server with a compilation function and that is generated by an Android operating system through compilation. The compilation result includes a Java file, and the Java file is generated by the improved AIDL tool by converting an AIDL file. In addition, if the device 100 is a server with a compilation function, the memory 202 stores Android operating system source code and a compilation result generated by compiling the Android operating system source code. The compilation result includes a Java file, and the Java file is generated by the improved AIDL tool by converting an AIDL file.

The transceiver 203 is configured to send a Java file generated by the processor 201 to the server 300 corresponding to the third-party application.

The processor 201 is configured to integrate an executable file into an Android software package of the local application. The transceiver 203 is further configured to send the Android software package of the local application to the terminal device 200.

In this embodiment of this application, a specific connection medium between the processor 201 and the memory 202 is not limited. In the embodiment of this application, the memory 202, the processor 201, and the transceiver 203 are connected to each other through a bus 204 in FIG. 2. The bus is represented by using a thick line in FIG. 2, and a connection manner between other components is merely described as an example, and is not limited thereto. The bus may be classified into an address bus, a data bus, a control bus, and the like. For ease of representation, only one thick line is used to represent the bus in FIG. 2, but this does not mean that there is only one bus or only one type of bus.

The memory 202 may be a volatile memory, such as a random access memory (RAM). Alternatively, the memory 203 may be a non-volatile memory, such as a read-only memory, a flash memory, a hard disk drive (HDD), or a solid-state drive (SSD). Alternatively, the memory 202 is, but not limited to, any other medium that can be used to carry or store program code in a form of an instruction or a data structure and can be accessed by a computer. The memory 203 may be a combination of the foregoing memories.

Figure 3:
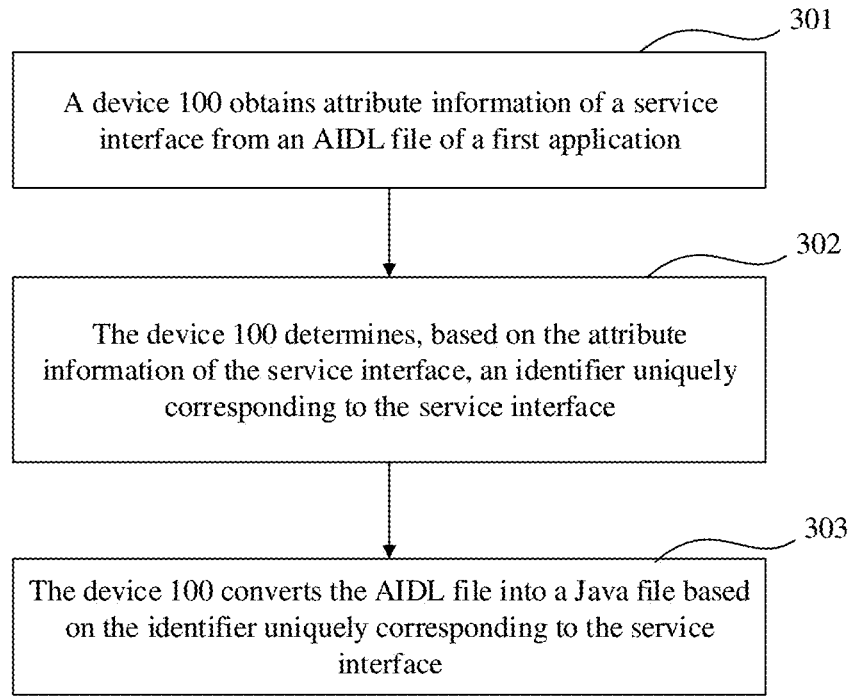
FIG. 3 is a schematic flowchart of an AIDL file conversion method according to an embodiment of this application.

FIG. 3 is a schematic flowchart of an AIDL file conversion method according to an embodiment of this application. The method may be performed by a device 100. Specific steps are as follows.

Step 301: The device 100 obtains attribute information of a service interface from an AIDL file of a first application.

The service interface is one or more service interfaces provided by the first application, and one or more applications installed on a terminal device may access another application installed on the terminal device. The first application in this embodiment of this application is an application accessed by another application, and the first application is usually an application included in a system. The first application may also be expressed as a local application or a service process. For example, the first application may be a camera application, a phone application, or a messages application in a smartphone. The attribute information may be at least one of an interface name and an interface parameter type of the service interface. The interface parameter type may be an integer type, a character type, a byte type, a Boolean type, or the like. For example, an interface name of an aperture service interface void execAperture( ){&image} in the camera application is execAperture( ), and an interface parameter type is &image (an original image address), and is the byte type.

Step 302: The device wo determines, based on the attribute information of the service interface, an identifier uniquely corresponding to the service interface.

The identifier uniquely corresponding to the service interface may be a string, a hash value, a random value, or the like. Specifically, in Manner 1, the device 100 performs a hash operation on at least one of the interface name and the interface parameter type of the service interface by using a hash function, to generate a hash value corresponding to the service interface. Different service interfaces have different hash values, and a same service interface has a same hash value. In Manner 2, the device 100 uses at least one of the interface name and the interface parameter type of the service interface as a random seed, and generates a random value by using a random function.

Step 303: The device 100 converts the AIDL file into a Java file based on the identifier uniquely corresponding to the service interface.

Specifically, the AIDL file is a service interface and a data declaration of the first application. An AIDL conversion tool in the device 100 generates the Java file from the AIDL file based on the identifier uniquely corresponding to the service interface. The generated Java file is packaged into a system software package of the first application.

It is assumed that the camera application in the mobile phone has three service interfaces: an aperture service interface, a portrait service interface, and a nightscape service interface. The device 100 defines the three service interfaces of the camera application into a first-version AIDL file. The first-version AIDL file is shown in Table 3.

TABLE 3 interface ICamera{
void Aperture( );//aperture service interface
void Portrait( );//portrait service interface
void Nightscape( );//nightscape service interface Then the AIDL conversion tool converts the first-version AIDL file into a first-version Java file shown in Table 4.

TABLE 4 static final int TRANSACTION_Aperture= 0XF6457850;//define 0XF6457850 as a hash value of the aperture service interface;
static final int TRANSACTION_Portrait= 0X21153431;//define 0X21153431 as a hash value of the portrait service interface;
static final int TRANSACTION_NIghtScape= 0X98342122//define 0X98342122 as a hash value of the nightscape service interface;
mRemote.transact(TRANSACTION_Aperture,..);//cross-process aperture service interface calling
mRemote.transact(TRANSACTION_Portrait,..);//cross-process portrait service interface calling
mRemote.transact(TRANSACTION_NIghtScape,..);//cross-process nightscape service interface calling
public boolean on Transact(int code,...){//conversion method
switch(code){
case TRANSACTION_Aperture:
 return execAperture( );//execute the aperture service interface of the camera application when a hash value is 0XF6457850
case TRANSACTION_Portrait:
 return execPortrait( );//execute the portrait service interface of the camera application when a hash value is 0X21153431
case TRANSACTION_Nightscape:
 return execNightscape( );//execute the nightscape service interface of the camera application when a hash value is 0X98342122
default:
 return false;//return false when a hash value is another value The device 100 packages the first-version Java file into a system software package. If the mobile phone of a user updates software, the mobile phone obtains the system software package including the first-version Java file from the device 100, and locally saves the system software package. Further, the device 100 sends the generated first-version Java file to a server 300 corresponding to at least one second application. The server 300 packages the first-version Java file into an application software package of the second application. The second application is an application accessing a service in the first application, and is also referred to as a third-party application or a client. For example, the first application is the camera application in the mobile phone, and the second application is a BeautyCam application.

It is assumed that the device 100 sends the first-version Java file shown in Table 4 to a server 300 of the BeautyCam application, and the server 300 packages the first-version Java file into an application software package of the BeautyCam application. If the user updates the BeautyCam application in the mobile phone, the mobile phone obtains the application software package including the first-version Java file from the server 300, and locally saves the application software package.

Assuming that the BeautyCam application calls the aperture service interface, the BeautyCam application determines, by using the first-version Java file, that a hash value corresponding to an interface name of the aperture service interface is 0XF6457850, and therefore sends a call request including the hash value 0XF6457850 to the camera application. The camera application determines, by using the first-version Java file, that a service interface corresponding to the hash value 0XF6457850 is execAperture( ), and therefore, the camera application executes a method object of execAperture( ) to generate an execution result, and sends the execution result to the BeautyCam application.

In a possible embodiment, assuming that a developer deletes some of the service interfaces in the first-version AIDL file, for example, deletes the aperture service interface, the device 100 defines the remaining two service interfaces of the camera application into a second-version AIDL file. Then the AIDL conversion tool converts the second-version AIDL file into a second-version Java file shown in Table 5. The device 100 packages the second-version Java file into an APK of the camera application. If the user updates the camera application in the mobile phone, the mobile phone obtains the APK including the second-version Java file from the device 100, and locally saves the APK.

the terminal device. The first application in this embodiment of this application is an application accessed by another application, and the first application is usually an application included in a system. The first application may also be

TABLE 5 static final int TRANSACTION_Portrait= 0X21153431;//define 0X21153431 as a hash value of the portrait service interface;
static final int TRANSACTION_NIghtScape= 0X98342122//define 0X98342122 as a hash value of the nightscape service interface;
mRemote.transact(TRANSACTIOAN_Portrait,..);//cross-process portrait service interface calling
mRemote.transact(TRANSACTION_NIghtScape,..);//cross-process nightscape service interface calling
public boolean on Transact(int code,...){//conversion method
switch(code){
case TRANSACTION_Portrait:
 return execPortrait( );//execute the portrait service interface of the camera application when a hash value is 0X21153431
case TRANSACTION_Nightscape:
 return execNightscape( );//execute the nightscape service interface of the camera application when a hash value is 0X98342122
default:
  return false;//return false when a hash value is another value Further, the device 100 further sends the generated second-version Java file to the server 300 corresponding to the at least one second application. The server 300 packages the second-version Java file into the APK of the second application.

It is assumed that the user does not update the BeautyCam application in the mobile phone, in other words, a Java file in the APK of the BeautyCam application in the mobile phone is still the first-version Java file. When the Beauty-Cam application calls the nightscape service interface, the BeautyCam application determines, by using the first-version Java file, that a hash value corresponding to an interface name of the nightscape service interface is 0X98342122, and therefore the BeautyCam application sends a call request including the hash value 0X98342122 to the camera application. The camera application determines, by using the second-version Java file, that a service interface corresponding to the hash value 0X98342122 is execNightscape( ), and therefore, the camera application executes a method object of execNightscape( ) to generate an execution result, and sends the execution result to the BeautyCam application.

It can be learned that, in the method provided in this embodiment of this application, although the second application accessing the first application uses an earlier-version Java file, the second application can still normally access the service in the first application that has a later-version Java file. The method provided in this embodiment of this application can improve compatibility of AIDL files of different versions and improve reliability of cross-process service calling.

Figure 4:
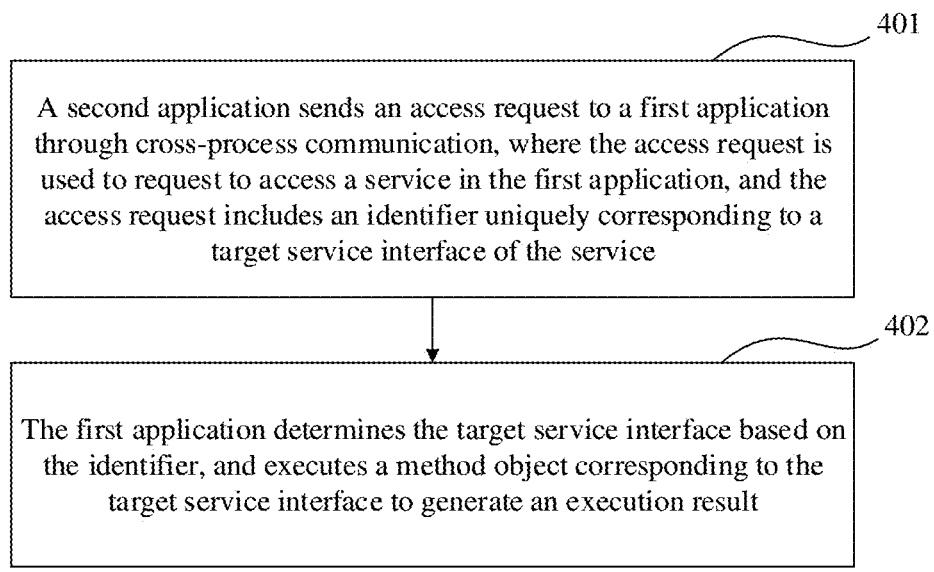
FIG. 4 is a schematic flowchart of a cross-process communication method according to an embodiment of this application.

Based on the foregoing AIDL file conversion method, an embodiment of this application further provides a schematic flowchart of a cross-process communication method. As shown in FIG. 4, the method is applicable to a terminal device including at least two applications. Specific steps are as follows:

Step 401: A second application sends an access request to a first application through cross-process communication.

The access request is used to request to access a service in the first application, and the access request includes an identifier uniquely corresponding to a target service interface of the service. One or more applications installed on the terminal device may access another application installed on expressed as a local application or a service process. For example, the first application may be a camera application, a phone application, or a messages application in a smartphone. The second application is an application accessing the service in the first application, and is also referred to as a third-party application or a client.

For example, assuming that the first application is a camera application, and the second application is a BeautyCam application, the BeautyCam application sends an access request for accessing an aperture service interface void execAperture( ) to the camera application through cross-process communication. The access request includes an identifier uniquely corresponding to the aperture service interface void execAperture( ). The identifier may be a string, a hash value, a random value, or the like. For a manner of generating the identifier, refer to the descriptions in step 303. Details are not described herein again.

Step 402: The first application determines the target service interface based on the identifier, and executes a method object corresponding to the target service interface to generate an execution result.

For example, after receiving the access request, the camera application determines, based on the identifier in the access request, that the target service interface is void execAperture( ), and therefore the camera application executes a method object of the service interface to generate an execution result.

In a possible embodiment, before the second application sends the access request to the first application through cross-process communication, the second application first determines, by using a first-version Java file, an identifier uniquely corresponding to attribute information of the target service interface.

For example, the BeautyCam application first determines, based on the first-version Java file, an identifier uniquely corresponding to attribute information of the aperture service interface. The attribute information includes at least one of an interface name and an interface parameter type of the target service interface. For example, the target service interface is the aperture service interface void execAperture( ){&image}, an interface name of the aperture service interface is execAperture( ), and an interface parameter type is &image (an original image address). BeautyCam determines, based on the first-version Java file shown in Table 4, that the identifier uniquely corresponding to the attribute information of the aperture service interface is 0XF6457850.

Further, the first application determines, by using a second-version Java file, the target service interface corresponding to the identifier. The second-version Java file corresponds to a second-version AIDL file of the first application. For example, after receiving the access request, the camera application determines, by using the second-version Java file, void execAperture corresponding to the identifier 0XF6457850.

Specifically, the following describes, with reference to the accompanying drawings and different application scenarios by using examples, the cross-process communication method provided in the embodiments of this application.

Scenario 1

Figure 5:
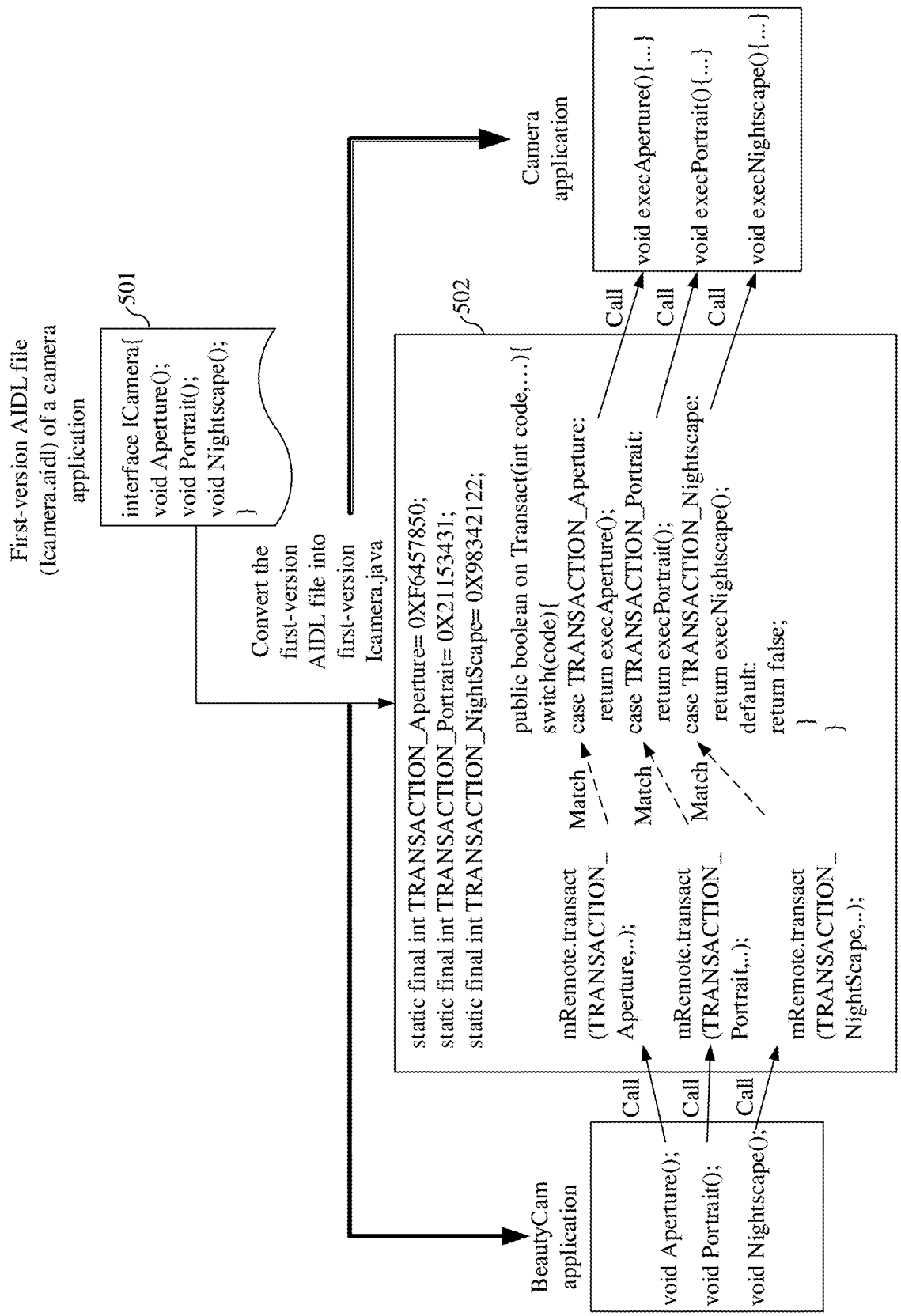
FIG. 5 is a schematic diagram of another cross-process communication method according to an embodiment of this application.

It is assumed that a first application is a camera application, a second application is a BeautyCam application, and an improved AIDL conversion tool in a device 100 converts a first-version AIDL file (Icamera.aidl shown in Table 3) 501 in FIG. 5 to generate a first-version Java file (Icamera.java shown in Table 4) 502.

Case 1: The BeautyCam application calls an aperture service interface void Aperture( ). To be specific, BeautyCam determines, by using the first-version Java file 502, that an identifier corresponding to the aperture service interface void Aperture( ) is 0XF6457850, and then the BeautyCam application sends an access request to the camera application. The access request includes the identifier 0XF6457850 corresponding to void Aperture( ). The camera application determines, by using the first-version Java file 502, that 0XF6457850 matches void execAperture( ) { . . . }, and therefore executes a method object of the interface to generate an execution result.

Case 2: The BeautyCam application calls a portrait service interface void Portrait( ). To be specific, BeautyCam determines, by using the first-version Java file 502, that an identifier corresponding to the portrait service interface void Portrait( ) is 0X21153431, and then the BeautyCam application sends an access request to the camera application. The access request includes the identifier 0XF6457850 corresponding to void Portrait( ). The camera application determines, by using the first-version Java file 502, that 0X21153431 matches void execPortrait( ){ . . . }, and therefore executes a method object of the interface to generate an execution result.

Case 3: The BeautyCam application calls a nightscape service interface void NightScape( ). To be specific, BeautyCam determines, by using the first-version Java file 502, that an identifier corresponding to the nightscape service interface void NightScape( ) is 0X98342122, and then the BeautyCam application sends an access request to the camera application. The access request includes the identifier 0X98342122 corresponding to void NightScape( ). The camera application determines, by using the first-version Java file 502, that 0X98342122 matches void execNightScape( ){ . . . }, and therefore executes a method object of the service interface to generate an execution result.

Scenario 2

Figure 6:
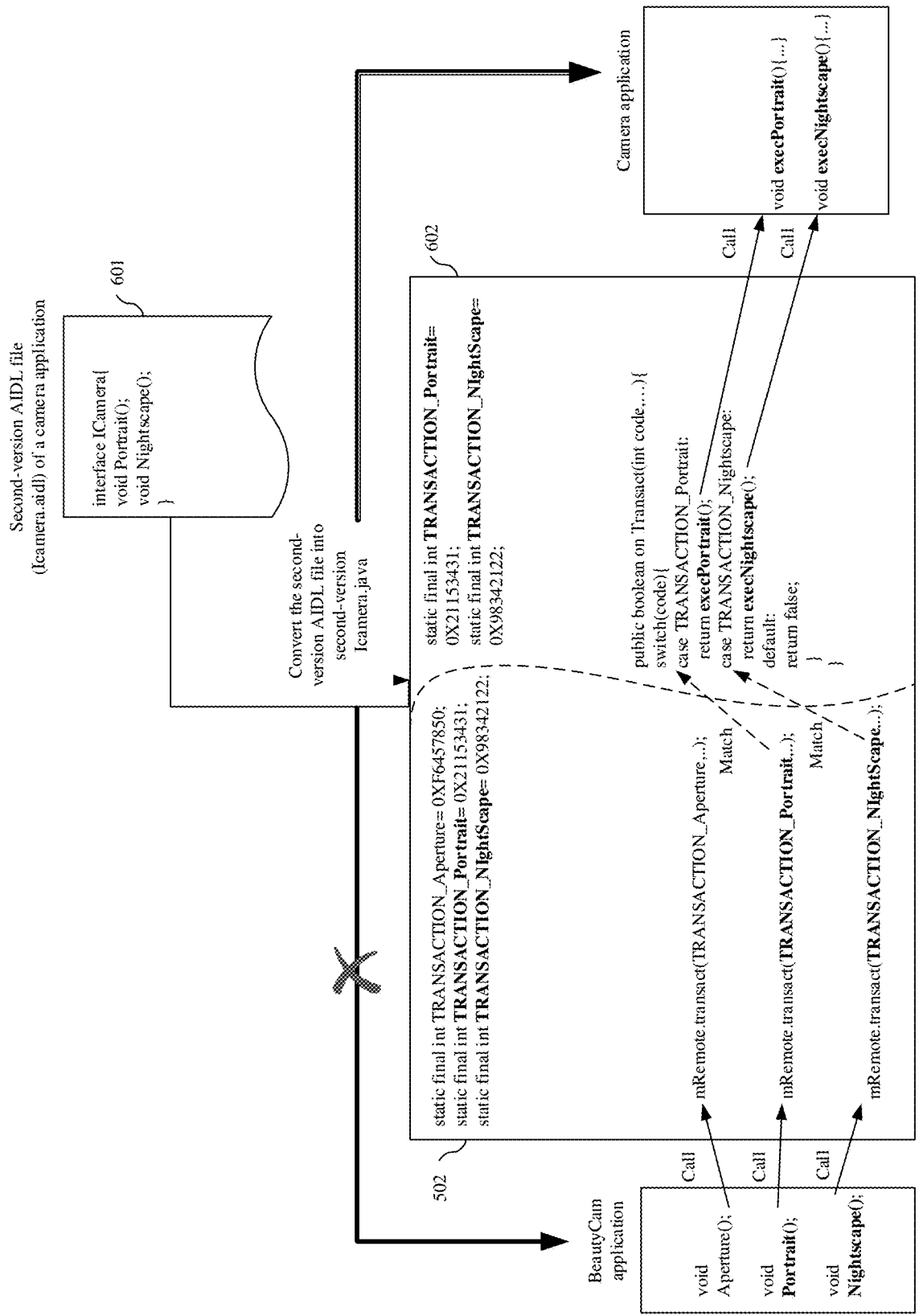
FIG. 6 is a schematic diagram of another cross-process communication method according to an embodiment of this application.

It is assumed that a developer deletes an aperture service interface in a first-version AIDL file to generate a second-version AIDL file, and an improved AIDL conversion tool in a device 100 converts the second-version AIDL file in FIG. 6 (601 in FIG. 6) to generate a second-version Java file (602 in FIG. 6). It is assumed that the device 100 does not send the second-version Java file to a server 300, in other words, an APK of a BeautyCam application does not include the second-version AIDL file, but still includes the first-version AIDL file.

Case 1: When accessing void Portrait( ) of a camera application, the BeautyCam application may still determine, by using a first-version Java file 502, that an identifier corresponding to a portrait service interface void Portrait( ) is 0X21153431, and then the BeautyCam application sends an access request to the camera application. The access request includes the identifier 0XF6457850 corresponding to void Portrait( ). The camera application determines, by using the second-version Java file 602, that 0X21153431 matches void execPortrait( ){ . . . }, and therefore executes a method object of the service interface to generate an execution result.

Case 2: When accessing a nightscape service interface void NightScape( ) of a camera application, the BeautyCam application may still determine, by using a first-version Java file 502, that an identifier corresponding to the nightscape service interface void NightScape( ) is 0X98342122, and then the BeautyCam application sends an access request to the camera application. The access request includes the identifier 0X98342122 corresponding to void NightScape( ). The camera application determines, by using the second-version Java file 602, that 0X98342122 matches void execNightScape( ){ . . . }, and therefore executes a method object of the service interface to generate an execution result.

Scenario 3

Figure 7:
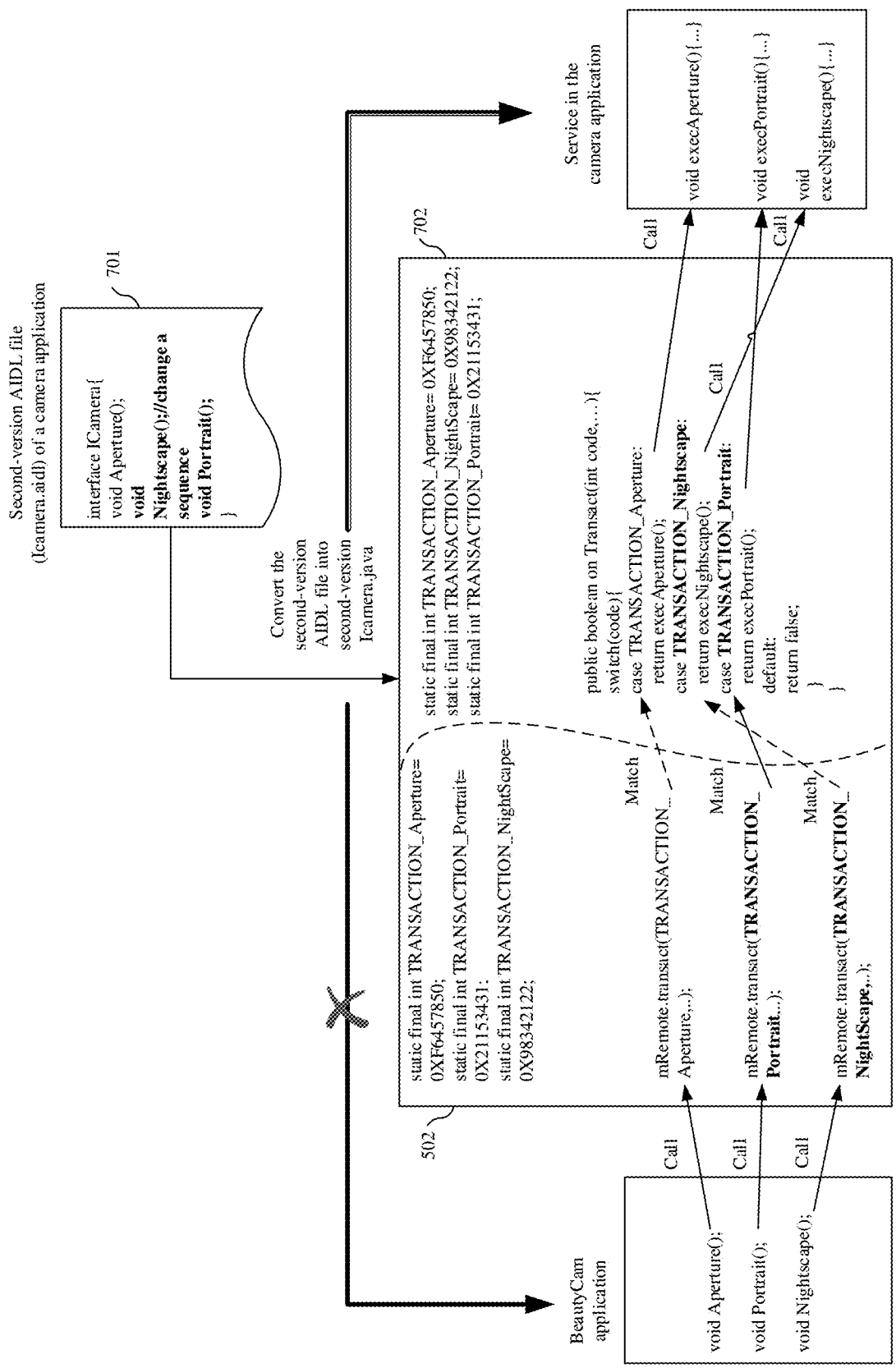
FIG. 7 is a schematic diagram of another cross-process communication method according to an embodiment of this application.

It is assumed that a developer changes a sequence of a portrait service interface and a nightscape service interface in a first-version AIDL file to generate a second-version AIDL file, and an improved AIDL conversion tool in a device 100 converts the second-version AIDL file in FIG. 7 (701 in FIG. 7) to generate a second-version Java file (702 in FIG. 7). It is assumed that the device 100 does not send the second-version Java file to a server 300, in other words, an APK of a BeautyCam application does not include the second-version AIDL file, but still includes the first-version AIDL file.

Case 1: The BeautyCam application calls an aperture service interface void Aperture( ). To be specific, BeautyCam determines, by using a first-version Java file 502, that an identifier corresponding to the aperture service interface void Aperture( ) is 0XF6457850, and then the BeautyCam application sends an access request to a camera application. The access request includes the identifier 0XF6457850 corresponding to void Aperture( ). The camera application determines, by using the second-version Java file 702, that 0XF6457850 matches void execAperture( ) { . . . }, and therefore executes a method object of the interface to generate an execution result.

Case 2: The BeautyCam application calls the portrait service interface void Portrait( ). To be specific, BeautyCam determines, by using a first-version Java file 502, that an identifier corresponding to the portrait service interface void Portrait( ) is 0X21153431, and then the BeautyCam application sends an access request to a camera application. The access request includes the identifier 0XF6457850 corresponding to void Portrait( ). The camera application determines, by using the second-version Java file 702, that 0X21153431 matches void execPortrait( ){ . . . }, and therefore executes a method object of the interface to generate an execution result.

Case 3: The BeautyCam application calls the nightscape service interface void NightScape( ). To be specific, BeautyCam determines, by using a first-version Java file 502, that an identifier corresponding to the nightscape service interface void NightScape( ) is 0X98342122, and then the BeautyCam application sends an access request to a camera application. The access request includes the identifier 0X98342122 corresponding to void NightScape( ). The camera application determines, by using the second-version Java file 702, that 0X98342122 matches void execNightScape( ) { . . . }, and therefore executes a method object of the interface to generate an execution result.

Scenario 4

Figure 8:
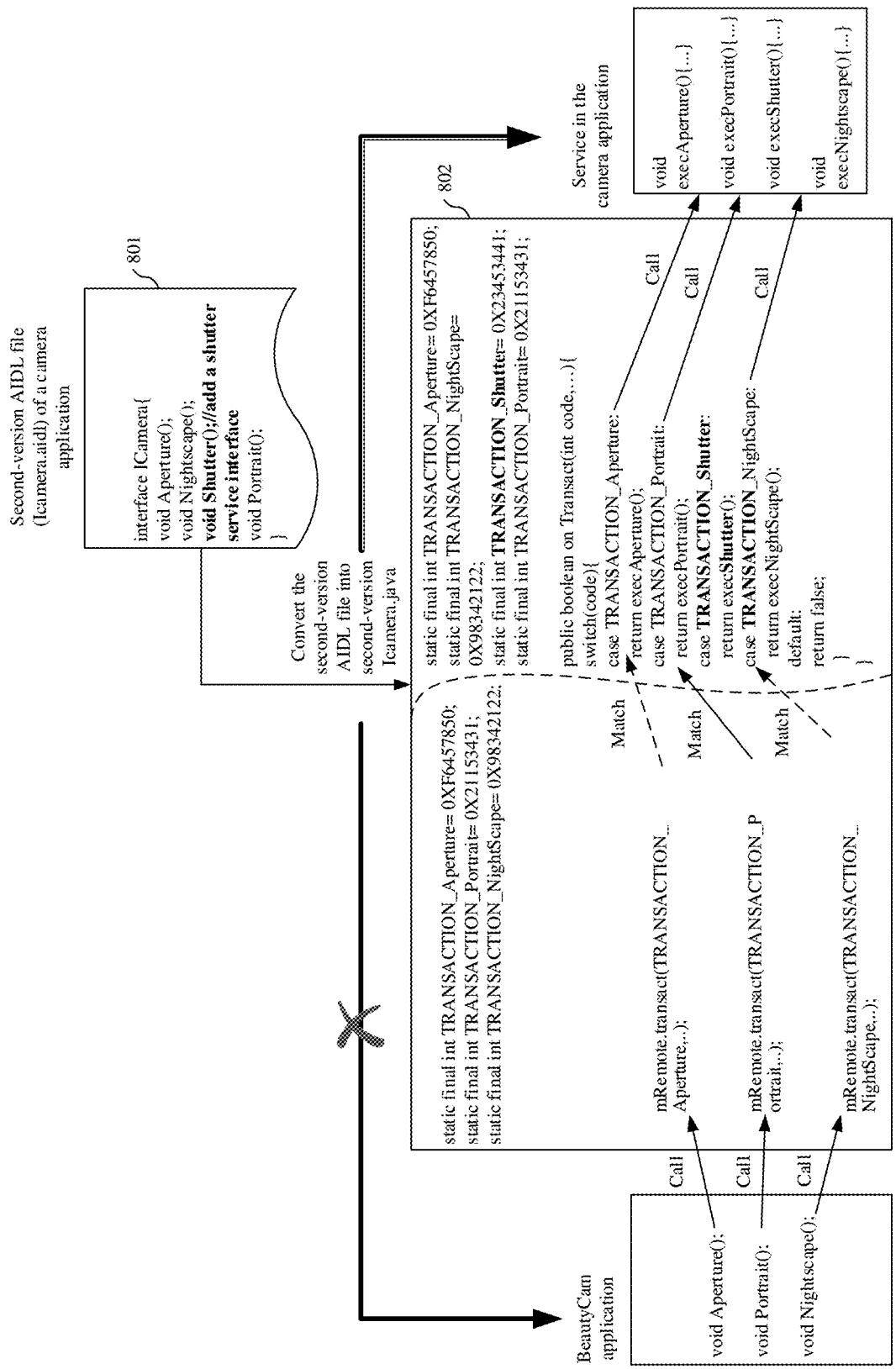
FIG. 8 is a schematic diagram of another cross-process communication method according to an embodiment of this application.

It is assumed that a developer inserts a shutter service interface before a nightscape service interface in a first-version AIDL file to generate a second-version AIDL file, and an improved AIDL conversion tool in a device 100 converts the second-version AIDL file in FIG. 8 (801 in FIG. 8) to generate a second-version Java file (802 in FIG. 8). It is assumed that the device 100 does not send the second-version Java file to a server 300, in other words, an APK of a BeautyCam application does not include the second-version AIDL file, but still includes the first-version AIDL file.

Case 1: The BeautyCam application calls an aperture service interface void Aperture( ). To be specific, BeautyCam determines, by using a first-version Java file 502, that an identifier corresponding to the aperture service interface void Aperture( ) is 0XF6457850, and then the BeautyCam application sends an access request to a camera application. The access request includes the identifier 0XF6457850 corresponding to void Aperture( ). The camera application determines, by using the second-version Java file 802, that 0XF6457850 matches void execAperture( ) { . . . }, and therefore executes a method object of the interface to generate an execution result.

Case 2: The BeautyCam application calls a portrait service interface void Portrait( ). To be specific, BeautyCam determines, by using a first-version Java file 502, that an identifier corresponding to the portrait service interface void Portrait( ) is 0X21153431, and then the BeautyCam application sends an access request to a camera application. The access request includes the identifier 0XF6457850 corresponding to void Portrait( ). The camera application determines, by using the second-version Java file 802, that 0X21153431 matches void execPortrait( ) { . . . }, and therefore executes a method object of the interface to generate an execution result.

Case 3: The BeautyCam application calls the nightscape service interface void NightScape( ). To be specific, BeautyCam determines, by using a first-version Java file 502, that an identifier corresponding to the nightscape service interface void NightScape( ) is 0X98342122, and then the BeautyCam application sends an access request to a camera application. The access request includes the identifier 0X98342122 corresponding to void NightScape( ). The camera application determines, by using the second-version Java file 802, that 0X98342122 matches void execNightScape( ) { . . . }, and therefore executes a method object of the interface to generate an execution result.

In the embodiments of this application, different service interfaces correspond to different identifiers, and a same service interface corresponds to a same identifier. Therefore, a client can access a service in a service process based on an identifier uniquely corresponding to a service interface. Interface compatibility of software in a conventional sense means that an interface sequence and an interface quantity are allowed to change with evolution of a version while an interface name and an interface form remain unchanged. Based on the improved AIDL conversion tool provided in the embodiments of this application, a software designer can design and upgrade a software interface according to a conventional compatibility method without worrying about a problem of incompatibility caused by a change of an interface sequence and a change of an interface quantity. In addition, even if versions of AIDL files in the client and the service process are different, normal access can be implemented to some extent. Therefore, the method provided in the embodiments of this application improves reliability of cross-process service calling to some extent.

Figure 9:
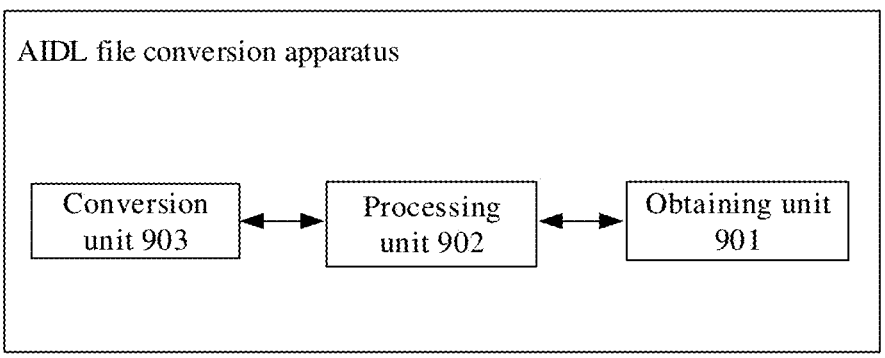
FIG. 9 is a schematic flowchart of an AIDL file conversion method according to an embodiment of this application.

Based on the foregoing AIDL file conversion method, an embodiment of this application provides an AIDL file conversion apparatus. Referring to FIG. 9, the apparatus may be the foregoing improved AIDL conversion tool, the apparatus may be integrated into a device 100, and the apparatus includes an obtaining unit 901, a processing unit 902, and a conversion unit 903. The obtaining unit 901 is configured to obtain attribute information of each service interface in an AIDL file of a first application, and the processing unit 902 is configured to determine, based on the attribute information of each service interface, an identifier uniquely corresponding to each service interface. The conversion unit 903 is configured to convert the AIDL file into a Java file based on the identifier uniquely corresponding to each service interface.

In a possible implementation, the attribute information includes at least one of an interface name and an interface parameter type. The processing unit 902 is specifically configured to perform a hash operation on at least one of an interface name and an interface parameter type of each service interface to generate a hash value corresponding to each service interface. Different service interfaces have different hash values, and a same service interface has a same hash value.

The conversion unit 903 is specifically configured to convert the AIDL file into the Java file based on the hash value corresponding to each service interface.

It should be understood that the memory 202 in FIG. 2 includes a computer program corresponding to the apparatus, and the processor 201 is configured to perform functions of the obtaining unit 901, the processing unit 902, and the conversion unit 903.

In some embodiments of this application, the terminal device 200 may be a portable device, for example, a mobile phone, a tablet computer, or a wearable device (for example, a smart watch) having a wireless communication function. An example embodiment of the portable device includes but is not limited to a portable device using iOS®, Android®, Microsoft®, or another operating system.

Figure 10:
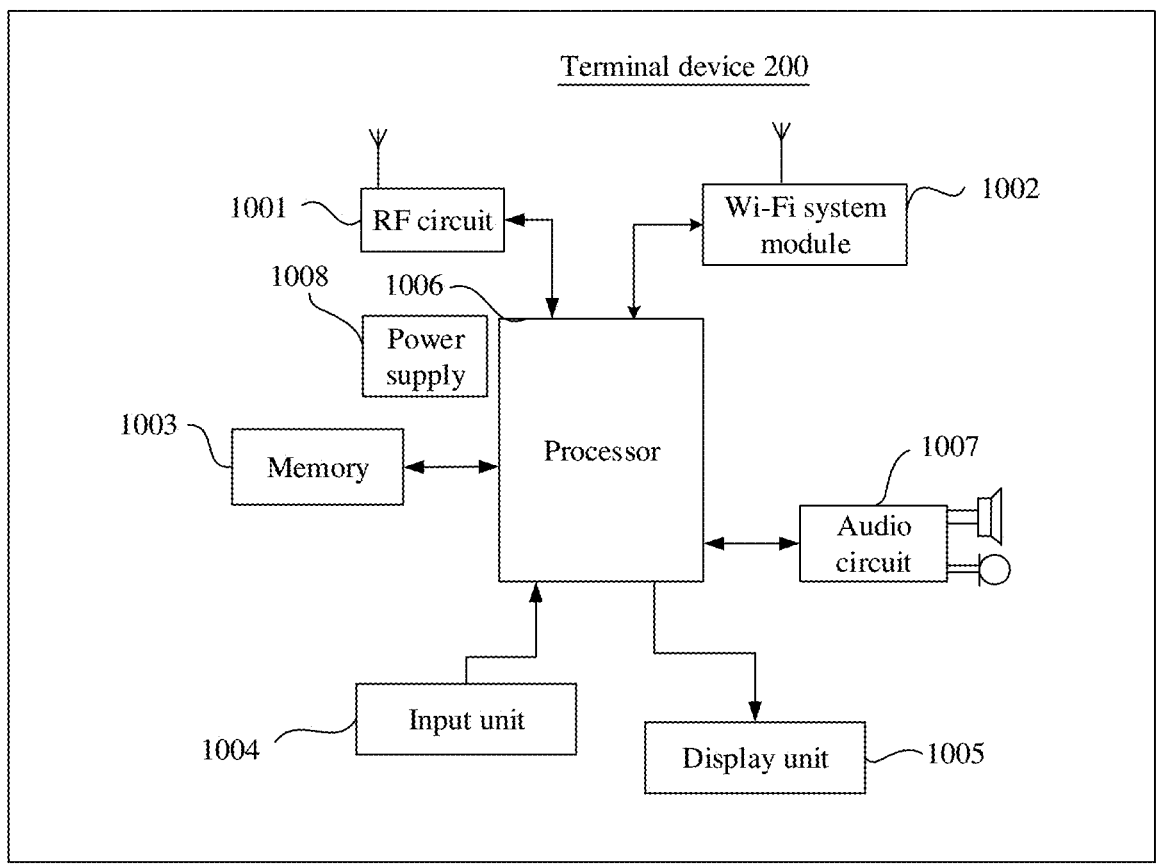
FIG. 10 is a schematic diagram of a structure of a mobile phone according to an embodiment of this application.

The following describes an example in which the terminal is a mobile phone. FIG. 10 is a block diagram of a partial structure of the terminal device 200 related to the embodiments of the present invention.

As shown in FIG. 10, the terminal device 200 is a mobile phone, and the mobile phone includes components such as an RF (radio frequency) circuit 1001, a Wi-Fi system module 1002, a memory 1003, an input unit 1004, a display unit 1005, a processor 1006, an audio circuit 1007, and a power supply 1008. A person skilled in the art may understand that the structure of the mobile phone shown in FIG. 10 constitutes no limitation on the mobile phone. The mobile phone may include more or fewer components than those shown in the figure, may combine some components, or may have different component arrangements.

The following specifically describes each constituent component of the terminal device 200 with reference to FIG. 10.

The Wi-Fi system module 1002 is configured to: scan a Wi-Fi access point existing in an environment around the terminal device 200, and obtain related information, so that the terminal device 200 accesses the Wi-Fi access point based on the related information.

The RF circuit 1001 is configured to receive and send information, or to receive and send a signal in a call process. Particularly, after receiving downlink information of a base station, the RF circuit 1001 sends the downlink information to the processor 1006 for processing. In addition, the RF circuit sends uplink data to the base station. In this embodiment of this application, the RF circuit 1001 is connected to a Wi-Fi antenna of the Wi-Fi system module to control scanning of the Wi-Fi antenna for a Wi-Fi network. Generally, the RF circuit 1001 includes but is not limited to an antenna, at least one amplifier, a transceiver, a coupler, a low noise amplifier (LNA), a duplexer, and the like. In addition, the RF circuit 1001 may further communicate with a network and another device through wireless communication.

The memory 1003 is configured to store a software program of the terminal device 200. Generally, the memory 1003 may include a high-speed random access memory, and may further include a non-volatile memory, for example, at least one magnetic disk storage device, a flash storage device, or another volatile solid-state storage device.

The processor 1006 is a control center of the terminal device 200, is connected to each part of the entire mobile phone through various interfaces and lines, and performs various functions of the terminal device 200 and data processing by running or executing the software program stored in the memory 1003 and by invoking the data stored in the memory 1003.

The processor 1006 may include one or more processing units. Preferably, an application processor and a modem processor may be integrated into the processor 1006. The application processor mainly processes the operating system, a user interface, an application, or the like. The modem processor mainly processes wireless communication. It may be understood that, alternatively, the modem processor may not be integrated into the processor 1006.

The input unit 1004 may be configured to receive entered digit or character information, and generate key signal input related to a user setting and function control of the terminal device 200. Specifically, the input unit 1004 may include a touchscreen and another input device. The touchscreen, also referred to as a touch panel, may collect a touch operation of a user that is performed on or nearby the touchscreen, and drive a corresponding connection apparatus according to a preset program. The another input device may include but is not limited to one or more of a physical keyboard, a function key (such as a volume control key or a power on/off key), a trackball, a mouse, a joystick, or the like.

The display unit 1005 may be configured to display information entered by the user or information provided to the user, and various menus of the mobile phone 200. The display unit 1005 may include a display panel. Optionally, the display panel may be configured in a form of a liquid crystal display (LCD), an organic light-emitting diode (OLED), or the like.

The audio circuit 1007 is connected to a speaker and a microphone, and may provide an audio interface between the user and the mobile phone 200. The audio circuit 1007 may convert received audio data into an electrical signal, and transmit the electrical signal to the loudspeaker. The loudspeaker converts the electrical signal into a sound signal and outputs the sound signal. In addition, the microphone converts the collected sound signal into an electrical signal. The audio circuit receives the electrical signal, converts the electrical signal into audio data, and then outputs the audio data to the RF circuit 1001, so that the RF circuit 110 sends the audio data to, for example, another mobile phone, or outputs the audio data to the memory 1003 for further processing.

The mobile phone 200 further includes the power supply 1008 (such as a battery) that supplies power to each component. Preferably, the power supply may be logically connected to the processor 1006 by using a power management system, to implement functions such as charging management, discharging management, and power consumption management by using the power management system.

Although not shown, the terminal device 200 may further include a Bluetooth module, a sensor, a GPS, and the like. Details are not described herein.

In addition, a software system of the terminal device 200 may use a layered architecture, an event-driven architecture, a microkernel architecture, a micro service architecture, or a cloud architecture. In this embodiment of the present invention, an Android system with the layered architecture is used as an example to describe a software structure of the terminal device 200.

Figure 11:
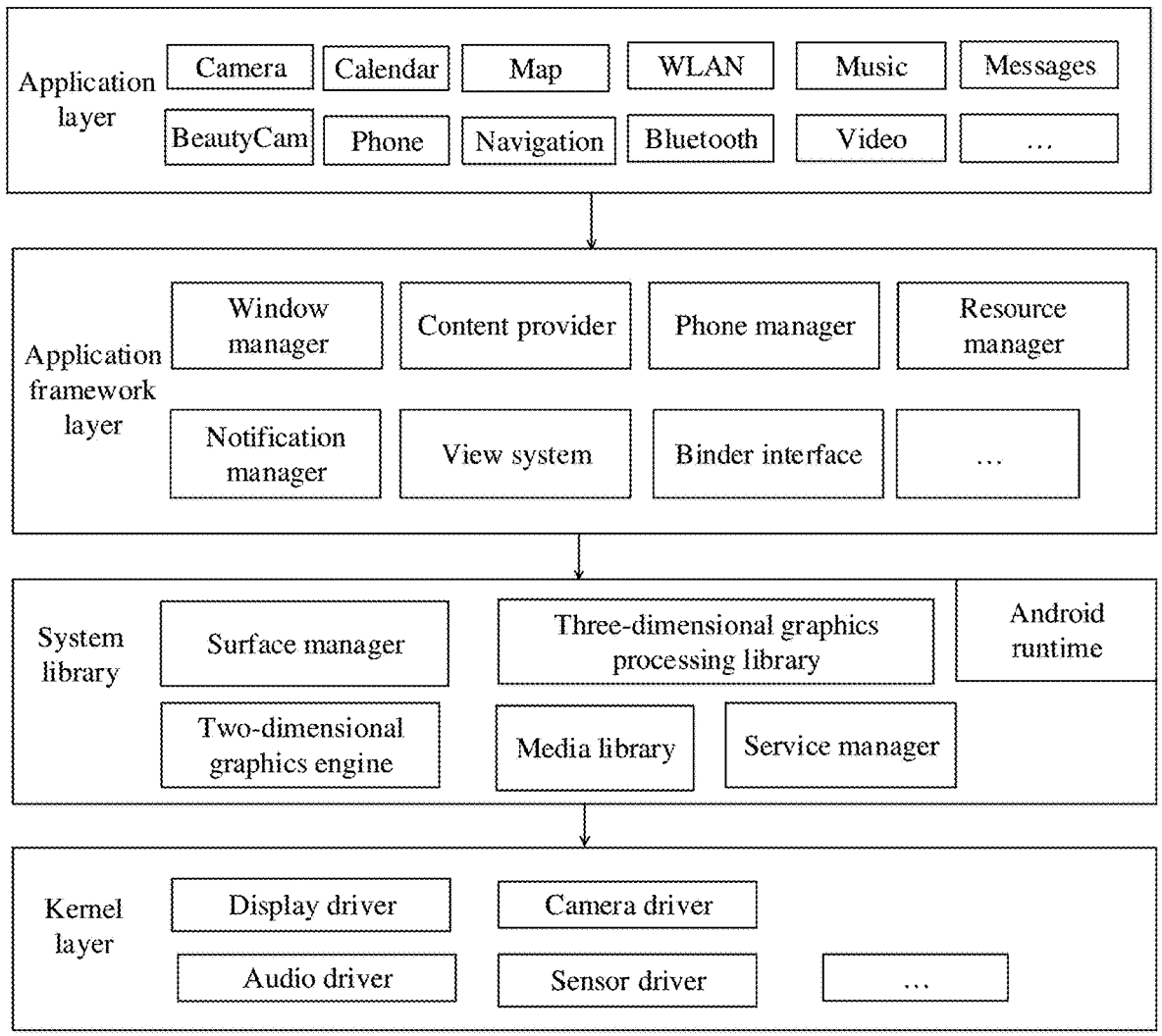
FIG. 11 is a schematic diagram of a structure of an Android operating system according to an embodiment of this application.

FIG. 11 is a block diagram of a software structure of a terminal device 200 according to an embodiment of the present invention.

In the layered architecture, software is divided into several layers, and each layer has a clear role and task. The layers communicate with each other through a software interface. In some embodiments, the Android system is divided into four layers: an application layer, an application framework layer, an Android runtime and system library, and a kernel layer from top to bottom.

The application layer may include a series of application packages.

As shown in FIG. 1*i*, the application packages may include a local application and a third-party application. For example, the local application is Camera, Gallery, Calendar, Phone, Map, Navigation, WLAN, Bluetooth, Music, Video, or Messages, and the third-party application is an application such as BeautyCam, Meitu Xiu Xiu, WeChat, or Weibo.

The application framework layer provides an application programming interface (API) and a programming framework for an application at the application layer. The application framework layer includes some predefined functions. For example, the application framework layer includes a method class corresponding to an aperture service interface (void Aperture) provided by the camera application, a method class corresponding to a portrait service interface (void Portrait) provided by the camera application, and a method class corresponding to a nightscape service interface (void Nightscape) provided by the camera application.

As shown in FIG. 1*i*, the application framework layer may include a window manager, a content provider, a view system, a phone manager, a resource manager, a notification manager, a service manager, a binder interface based on a Java language, and the like.

The binder interface provides inter-process communication services to applications in the application layer by calling a binder runtime library in a system library by using a JNI. For example, the third-party application in the application layer sends an access request to the local application by using the binder interface, and the binder interface in the application framework layer calls the binder runtime library in the system library by using the JNI, to provide an inter-process communication service for the third-party application in the application layer.

The window manager is configured to manage a window program. The window manager may obtain a size of a display, determine whether there is a status bar, perform screen locking, take a screenshot, and the like.

The content provider is configured to: store and obtain data, and enable the data to be accessed by an application. The data may include a video, an image, audio, calls that are made and received, a browsing history and bookmarks, a phone book, and the like.

The view system includes visual controls, such as a control for displaying a text and a control for displaying a picture. The view system may be configured to construct an application. A display interface may include one or more views. For example, a display interface including a Messages notification icon may include a text display view and a picture display view.

The phone manager is configured to provide a communication function of the terminal device 200, for example, management of a call status (including answering, declining, or the like).

The resource manager provides various resources for an application, such as a localized character string, an icon, a picture, a layout file, and a video file.

The notification manager enables an application to display notification information in a status bar, and may be configured to convey a notification type message. The notification manager may automatically disappear after a short pause without user interaction. For example, the notification manager is configured to provide notifications of download completing, a message prompt, and the like. The notification manager may alternatively be a notification that appears in a top status bar of the system in a form of a graph or a scroll bar text, for example, a notification of an application running on the background or a notification that appears on the screen in a form of a dialog window. For example, text information is displayed in the status bar, an alert sound is played, the electronic device vibrates, or the indicator light blinks.

The Android runtime includes a kernel library and a virtual machine. The Android runtime is responsible for scheduling and management of the Android system.

The kernel library includes two parts: a function that needs to be invoked in Java language and a kernel library of Android.

The application layer and the application framework layer run on the virtual machine. The virtual machine executes Java files at the application layer and the application framework layer as binary files. The virtual machine is configured to perform functions such as object life cycle management, stack management, thread management, security and exception management, and garbage collection. In this embodiment of this application, the virtual machine executes a first Java file in an application software package of the third-party application and a second Java file in a system software package as binary files.

The system library may include a plurality of function modules, for example, a surface manager, a media library, a three-dimensional graphics processing library (for example, OpenGL ES), and a 2D graphics engine (for example, SGL).

The surface manager is configured to: manage a display subsystem and provide fusion of 2D and 3D layers for a plurality of applications.

The media library supports playback and recording of a plurality of commonly used audio and video formats, static image files, and the like. The media library may support a plurality of audio and video coding formats such as MPEG-4, H.264, MP3, AAC, AMR, JPG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following illustrates a working procedure of software and hardware in the terminal device 200 with reference to a photographing scenario.

When the touch sensor receives a photographing operation performed by a user on the BeautyCam application, a corresponding hardware interrupt is sent to the kernel layer. The kernel layer processes the photographing operation into an original input event (including information such as touch coordinates and a time stamp of a touch operation). The original input event is stored at the kernel layer. The application framework layer obtains the original input event from the kernel layer. After the service manager receives the original input event from the application framework layer, the service manager calls a service in the local camera application that is in the application framework layer and that establishes a binding relationship with the BeautyCam application. In other words, the service manager sends an access request to the local camera application by using the binder interface. The access request carries a command code uniquely corresponding to a target service interface, a command parameter, and the like that are obtained by the BeautyCam application from a Java file. It is assumed that the target service interface is a portrait service interface (void Portrait). After receiving the access request, the service in the local camera application enables the camera driver in the kernel layer to start to capture an original image, and in addition, enables a facial enhancement algorithm corresponding to a portrait scenario to perform face detection on the image and perform secondary processing and rendering based on a specified parameter. Finally, the service in the local camera application transmits a processed composite image to the BeautyCam application by using a predefined callback interface (which is similar to the foregoing binder interface, but roles of a requester and a recipient are interchanged), and the BeautyCam application displays the obtained portrait image in an interface.

Figure 12:
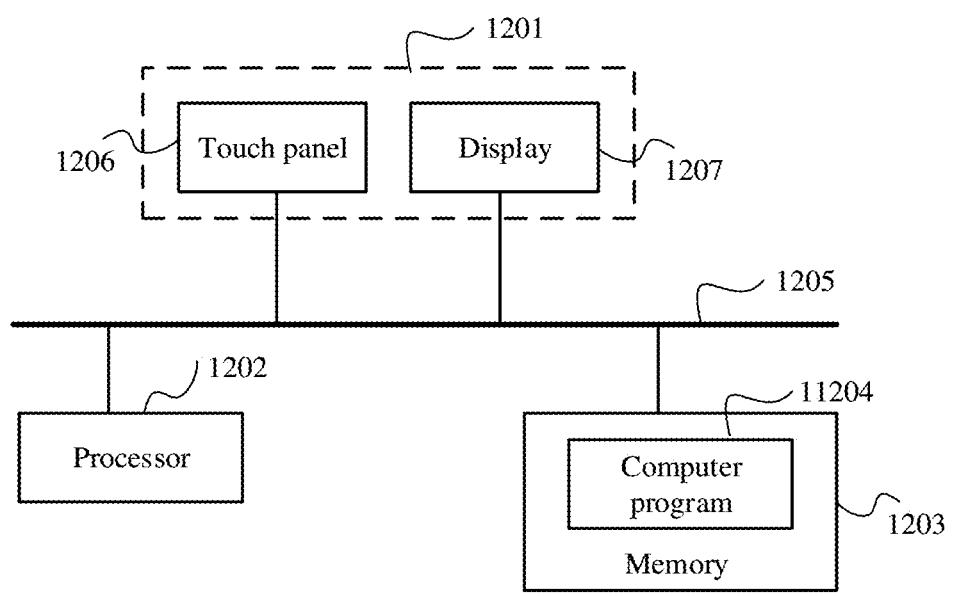
FIG. 12 is a schematic diagram of a structure of a terminal device according to an embodiment of this application.

In some other embodiments of this application, the embodiments of this application disclose a terminal device. As shown in FIG. 12, the terminal device may include a touchscreen 1201, where the touchscreen 1201 includes a touch panel 1206 and a display 1207; one or more processors 1202; a memory 1203; one or more applications (not shown); and one or more computer programs 1204. The foregoing components may be connected by using one or more communications buses 1205. The one or more computer programs 1204 are stored in the memory 1203 and are configured to be executed by the one or more processors 1202. The one or more computer programs 1204 include instructions, and the instructions may be used to perform the steps in FIG. 4 and the corresponding embodiments.

An embodiment of this application further provides a computer storage medium. The computer storage medium stores computer instructions. When the computer instructions are run on an electronic device, the electronic device is enabled to perform the related method steps, to implement the method in the foregoing embodiment.

An embodiment of this application further provides a computer program product. When the computer program product is run on a computer, the computer is enabled to perform the foregoing related steps, to implement the method in the foregoing embodiments.

In addition, an embodiment of this application further provides an apparatus. The apparatus may be specifically a chip, a component, or a module. The apparatus may include a processor and a memory that are connected to each other. The memory is configured to store computer-executable instructions. When the apparatus runs, the processor may execute the computer-executable instructions stored in the memory, to enable the chip to perform the—method in the foregoing method embodiments.

The electronic device, the computer storage medium, the computer program product, or the chip provided in this embodiment of this application is configured to perform the corresponding method provided above. Therefore, for beneficial effects that can be achieved, refer to the beneficial effects of the corresponding method provided above. Details are not described herein again.

Based on descriptions about the foregoing implementations, a person skilled in the art may understand that, for a purpose of convenient and brief description, division into the foregoing function modules is used as an example for illustration. During actual application, the foregoing functions may be allocated to different modules and implemented based on a requirement. In other words, an inner structure of an apparatus is divided into different function modules to implement all or some of the functions described above.

In the several embodiments provided in this application, it should be understood that the disclosed apparatus and method may be implemented in another manner. For example, the described apparatus embodiment is merely an example. For example, the division into the modules or units is merely logical function division and may be other division in an actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed at different places. Some or all of the units may be selected depending on actual requirements to achieve the objectives of the solutions in the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions in the embodiments of this application essentially, or the part contributing to the conventional technology, or all or some of the technical solutions may be implemented in a form of a software product. The software product is stored in a storage medium and includes several instructions for instructing a device (which may be a single-chip microcomputer, a chip, or the like) or a processor to perform all or some of the steps of the methods described in the embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method, comprising:
   determining, by at least one second application of a terminal device by using a first Java file, an identifier uniquely corresponding to attribute information of a target service interface of a service, wherein the first Java file corresponds to a first-version android interface definition language (AIDL) file of a first application;
   sending, by the at least one second application of the terminal device, an access request to a first application of the terminal device through cross-process communication, wherein the access request requests to access the service in the first application, the access request comprises the identifier uniquely corresponding to the target service interface of the service, and the target service interface corresponds to a target service provided by the first application;
   determining, by the first application, the target service interface based on the identifier, wherein determining, by the first application, the target service interface based on the identifier comprises determining, by the first application using a second Java file, the target service interface corresponding to the identifier, wherein the second Java file corresponds to a second-version AIDL file of the first application; and
   executing, by the first application, a method object corresponding to the target service interface to generate an execution result.

2. The method according to claim 1, wherein the first Java file is obtained by converting the first-version AIDL file according to a rule, the second Java file is obtained by converting the second-version AIDL file according to the rule, and the rule comprises:
   obtaining attribute information of each service interface from the first-version AIDL file of the first application;
   determining, based on the attribute information of each service interface, an identifier uniquely corresponding to each service interface; and
   converting the first-version AIDL file or the second-version AIDL file into a Java file based on the identifier uniquely corresponding to each service interface.

3. The method according to claim 1, wherein the attribute information comprises an interface name of the target service interface.

4. The method according to claim 3, wherein the attribute information further comprises an interface parameter type of the target service interface.

5. The method according to claim 1, wherein the attribute information comprises an interface parameter type of the target service interface.

6. The method according to claim 1, wherein the identifier uniquely corresponding to the attribute information of the target service interface is a hash value obtained by performing a hash operation on the attribute information of the target service interface.

7. A terminal device, comprising:
a processor; and
a memory, configured to store one or more computer programs executable by the processor, and further store a system software package and an application software package of at least one second application, wherein the system software package comprises a first Java file, and the application software package comprises a second Java file; and
wherein the one or more computer programs include instructions for:
  determining, by the at least one second application by using the first Java file, a identifier uniquely corresponding to attribute information of a target service interface of a service, wherein the first Java file corresponds to a first-version android interface definition language (AIDL) file of a first application;
  sending, by the at least one second application, an access request to the first application through cross-process communication, wherein the access request requests to access the service in the first application, and the access request comprises the identifier uniquely corresponding to the target service interface of the service;
  determining, by the first application and by using the second Java file, the target service interface based on the identifier, wherein the second Java file corresponds to a second-version AIDL file of the first application; and
  executing, by the first application, a method object corresponding to the target service interface to generate an execution result.

8. The terminal device according to claim 7, wherein a first Java file is obtained by converting the first-version AIDL file according to a rule, a second Java file is obtained by converting the second-version AIDL file according to the rule, and the rule comprises:
  obtaining attribute information of each service interface from the first-version AIDL file of the first application;
  determining, based on the attribute information of each service interface, an identifier uniquely corresponding to each service interface; and
  converting the first-version AIDL file or the second-version AIDL file into a Java file based on the identifier uniquely corresponding to each service interface.

9. The terminal device according to claim 7, wherein the attribute information comprises an interface name of the target service interface.

10. The terminal device according to claim 9, wherein the attribute information further comprises an interface parameter type of the target service interface.

11. The terminal device according to claim 7, wherein the attribute information comprises an interface parameter type of the target service interface.

12. The terminal device according to claim 7, wherein the identifier uniquely corresponding to the attribute information of the target service interface is a hash value obtained by performing a hash operation on the attribute information of the target service interface.

13. A non-transitory computer-readable storage medium, wherein the non-transitory computer-readable storage medium comprises a computer program, and the computer program comprises instructions that, when the computer program is run on a terminal device, execution of the computer program causes the terminal device to:
  determine, by at least one second application of a terminal device by using a first Java file, an identifier uniquely corresponding to attribute information of a target service interface of a service, wherein the first Java file corresponds to a first-version android interface definition language (AIDL) file of a first application;
  send, by at least one second application, an access request to a first application through cross-process communication, wherein the access request requests to access the service in the first application, and the access request comprises the identifier uniquely corresponding to the target service interface of the service; and
  determine, by the first application and by using a second Java file, the target service interface based on the identifier, wherein the second Java file corresponds to a second-version AIDL file of the first application; and
  execute, by the first application, a method object corresponding to the target service interface to generate an execution result.

14. The non-transitory computer-readable storage medium according to claim 13, wherein the identifier uniquely corresponds to attribute information of the target service interface.

15. The non-transitory computer-readable storage medium according to claim 14, wherein the attribute information comprises an interface name of the target service interface.

16. The non-transitory computer-readable storage medium according to claim 14, wherein the attribute information comprises an interface parameter type of the target service interface.

* * * * *